United States Patent [19]

Moon

[11] 4,233,255
[45] Nov. 11, 1980

[54] METHOD FOR CONTROLLING THE THICKNESS OR WEIGHT OF EXTRUDED STOCK

[75] Inventor: William S. Moon, San Jose, Calif.

[73] Assignee: Measurex Corporation, Cupertino, Calif.

[21] Appl. No.: 964,502

[22] Filed: Nov. 29, 1978

[51] Int. Cl.³ .............................................. B29F 3/02
[52] U.S. Cl. .................................. 264/40.4; 264/40.7; 264/148; 425/140; 425/141; 425/377
[58] Field of Search ..................... 264/40.4, 40.7, 148; 425/140, 141, 377

[56] References Cited

U.S. PATENT DOCUMENTS

| | | | |
|---|---|---|---|
| 1,456,211 | 5/1923 | Bines | 425/377 |
| 1,594,845 | 8/1926 | Myers | 425/140 |
| 2,051,781 | 8/1936 | Brown | 425/140 |
| 2,156,895 | 5/1939 | Godat | 425/141 |
| 2,726,922 | 12/1955 | Merrill et al. | 425/140 |
| 4,087,499 | 5/1978 | Bayonnet | 264/40.4 |
| 4,088,721 | 5/1978 | Apicella, Jr. | 264/40.4 |
| 4,097,566 | 6/1978 | Bertin et al. | 264/40.7 |

Primary Examiner—Jeffery R. Thurlow
Attorney, Agent, or Firm—Ronald L. Yin

[57] ABSTRACT

An extruding system for the production of continuously extruded elastomer, such as tread stock for the manufacture of vehicle tires, has an extruder, a first takeaway conveyor belt for conveying the extrusion as it exits the extruder, a second conveyor belt for varying the thickness or weight of the extrusion after leaving the first conveyor belt, a sensor to measure the running-weigh-scale value and a targeted running-weigh-scale value. The weight or thickness of the continuously extruded elastomer is controlled by measuring the weight of the continuous extrusion at the running-weigh-scale. The measured value is compared to the target value to obtain a control signal. The control signal is used to adjust the difference in speed between the first conveyor belt and the second conveyor belt.

2 Claims, 1 Drawing Figure

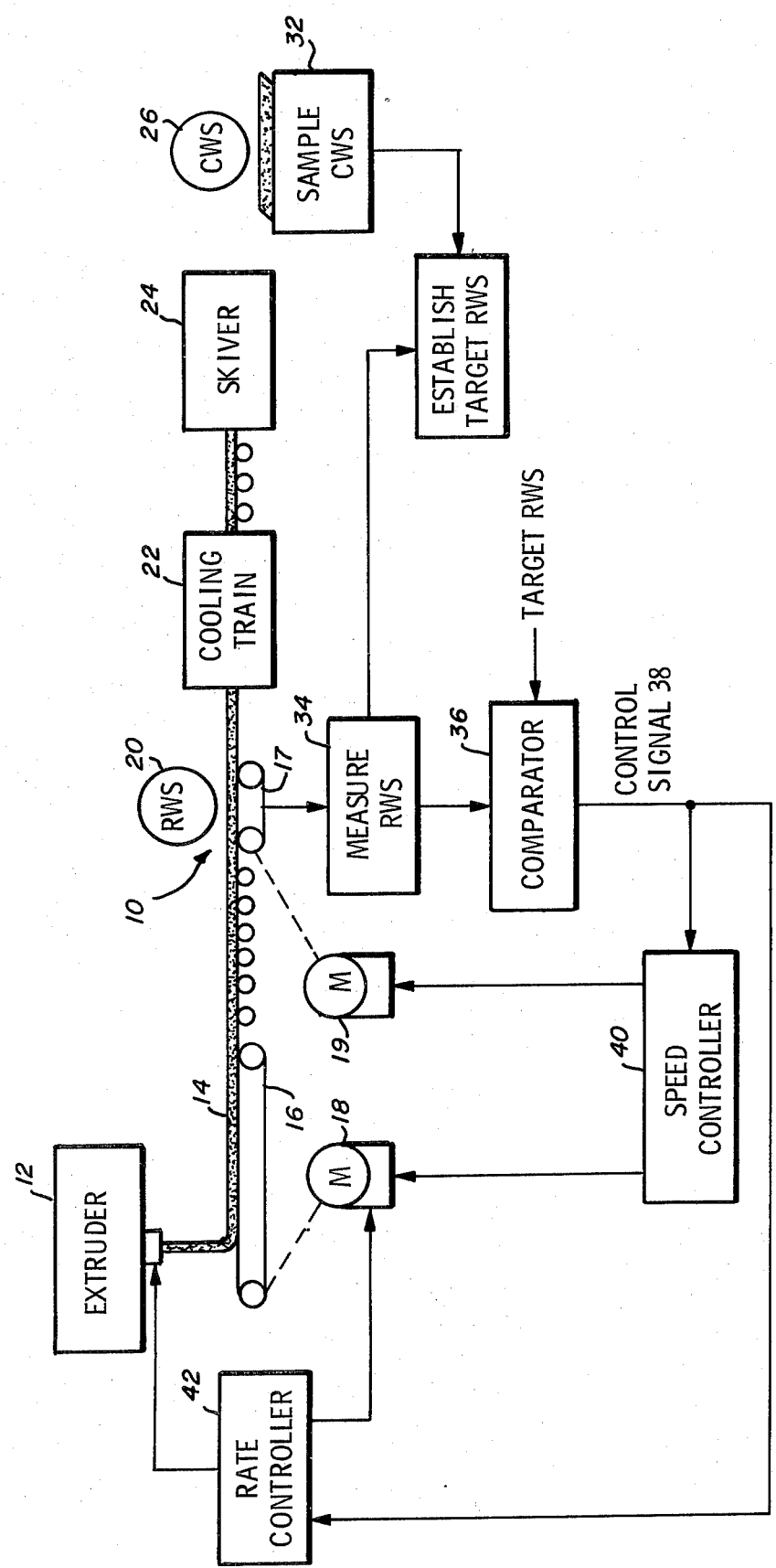

METHOD FOR CONTROLLING THE THICKNESS OR WEIGHT OF EXTRUDED STOCK

BACKGROUND OF THE INVENTION

1. Field of Invention

This invention generally relates to process control and more specifically to a method for accurately and automatically maintaining the desired weight or thickness of a continuously extruded elastomer that may be applied as tread stock in the manufacture of vehicle tires.

2. Prior Art

Heretofore, the elastomeric stock used for tire treads is extruded in a continuous sheet form of the desired width, cooled, and cut to the required length for a particular tire circumference. The thickness of tread stock has heretofore been controlled by monitoring the weight of the extruded material since its weight is directly related to the material thickness.

Monitoring of the extrusion is accomplished by comparing the weight of a running length of continuous extrusion as it passes over a running-weigh-scale (hereinafter referred to as the RWS) to the weight of a cut length of the material taken at a check weight scale (hereinafter referred to as the CWS) after the extrusion is cooled and skived. The tread stock specification is established at the CWS with the RWS providing a means for making a first approximation inasmuch as the RWS and CWS are at separate locations in the process. Once the relationship between RWS and CWS is established, the desired value of CWS can be translated into a desired value of RWS. The desired value of RWS is the target value of RWS.

A method for the control of the thickness of extruded stock is disclosed in U.S. Pat. No. 4,088,721. In that patent, the RWS is continuously compared with the CWS to obtain a targeted average. The measured RWS is compared to the targeted average to obtain a control signal. The control signal is used to increase or decrease the speed of a take-away conveyor belt, positioned at the exit orifice of the extruder. If, for example, the measured RWS is too high compared to the targeted RWS, the speed of the take-away conveyor belt is increased to stretch the extrusion. This will result in a thinner tread stock. Alternatively, if the RWS value is too low, resulting in a low value of CWS, indicative of a thinner tread stock, the take-away belt may be slowed down with the result being a thicker extrusion.

While the method described offers simplicity of operation, it has a number of drawbacks. These will be apparent and the advantages of the present invention will be discussed in the detailed description that follows.

SUMMARY OF THE INVENTION

The present invention is a method of controlling the thickness or weight of elastomer material continuously extruded from an extrusion system, wherein the system has an extruder, a first variable speed take-away conveyor belt to convey the extrusion as it exits the extruder, a second variable speed conveyor belt for varying the thickness or weight of the extrusion after leaving the first conveyor belt, a running-weigh-scale to measure the weight per unit length of the continuous extrusion, and a target running-weigh-scale value. The method comprises measuring the weight value of the extrusion at the running-weigh-scale; comparing the measured valued to the target value to obtain a control signal; and adjusting the difference in speed between the first conveyor belt and the second conveyor belt in response to the control signal.

BRIEF DESCRIPTION OF THE DRAWING

The single drawing is a block flow diagram illustrating the control method comprising the invention.

DETAILED DESCRIPTION OF THE INVENTION

Referring to the drawing, a process line for extruding elastomeric material is generally indicated by reference numeral 10. The line 10 conventionally comprises an extruder 12 for producing a sheet of elastomeric extrusion 14 that is carried away by a first variable speed conveyor 16 being driven by a first motor 18. The first variable speed conveyor 16 is generally referred to as a "take-away belt" and its purpose is to control elongation of the extrusion according to the take-away speed of the belt. The extrusion 14 is carried across a second variable speed conveyor 17. The second conveyor 17 is driven by a second motor 19, which conveys the extrusion 14 after leaving the first conveyor 16. The extrusion 14 is also carried across a running-weigh-scale (RWS) 20 to provide a measure of the weight per-unit-length of a typical section of the continuous extrusion as it passes thereover. Often the RWS 20 is directly at or near the second conveyor 17. From the RWS 20 the extrusion passes through a cooling train 22 to establish a "set" in the material so that it may be handled further by a skiver 24 that cuts the extrusion into a suitable length for production use. For example, in a tire manufacturing facility the extrusion will be the tread portion of a tire and it is, therefore, cut to the desired tire circumference. Upon leaving the skiver the cut tread sections are weighed at a check-weigh-scale (CWS) 26 to make certain that all treads are within a weight specification since the weight is directly related to the thickness of the extrusion. The line 10 also comprises a target RWS value. The target RWS value may be a value decided by the operator of the line 10 based upon his experience. The target RWS value may also be a value derived from the CWS 26. Cut tread sections, weighed at CWS 26, are sampled at 32. Select samples of CWS 26 are used to establish target RWS. One way is to sample CWS 26 until the desired weight, and therefore thickness, is obtained. The measured value of RWS 34 for that sample of CWS 26 is then used to establish the target RWS.

In the method of the present invention, the extrusion 14 is measured at RWS 20. The measured value of RWS 34 is entered into a comparator 36. The target value of RWS is also entered into comparator 36. The comparator 36 compares the measured value of RWS 34 to the target value of RWS; where there is a difference, a control signal 38 results. The control signal 38 is entered into the speed controller 40. Based upon the control signal 38, the speed controller 40 adjusts the difference in speed between the first motor 18 and the second motor 19. For example, if the measured RWS 34 is too high compared to the target RWS (indicating that the extrusion 14 is too thick) then the comparator 36 sends a control signal 38 to speed controller 40 to speed up the second motor 19 in relationship to the first motor 18. This will have the effect of stretching the extrusion 14. Conversely, slowing down the second motor 19 in relationship to the first motor 18 will have the effect of making thicker extrusion 14 with a resultant increase in the value of measured RWS 34.

In a further refinement to the method of the present invention, the control signal 38 can also be used in the rate controller 42. The rate controller 42 controls the rate of extrusion of the extruder 12 and the speed of the first motor 18. The rate controller 42 can be used as a further refinement to the control of line 10. For example, if the measured value of RWS 34 is still high relative to the target value of RWS (indicating the need to stretch the extrusion 14 out some more) and if the difference in speed between the first motor 18 and the second motor 19 is such that the difference in speed cannot be increased (without of course turning off the first motor 18 entirely), then the rate controller 42 may be used. In this instance the rate controller 42 would decrease the rate of extrusion from the extruder 12 in relationship to the speed of the first motor 18.

The advantages of the method of the present invention over the prior art, e.g. U.S. Pat. No. 4,088,721, can now be seen. Firstly, in the present invention, the method controls the production of thickness or weight of elastomer material through two variables, i.e. the first motor 18 and the second motor 19. It is the difference in relative speed between the first and second motors 18 and 19, that controls the increase or decrease in thickness or weight. Thus, a greater degree of control and accuracy is achieved. Secondly, as previously discussed, often the RWS 20 is located at or near the second conveyor 17. Thus, a very fast response is possible. Finally, since the method of the present invention provides for a target value of RWS, which can be an a priori known fact based upon, such as, an operator's experience, it is possible to achieve feed forward control during initial start up of the production of line 10. This would save energy and material during start up.

What is claimed is:

1. In a process comprising an extruder, having a rate of extrusion, a continuous sheet length of elastomeric extrusion, a first variable speed take-away conveyor belt to convey the extrusion as it exits the extruder, a second variable speed conveyor belt for varying the thickness or weight of the extrusion after leaving the first conveyor belt, a running-weigh-scale to measure the weight per unit area of the continuous extrusion after said extrusion commences to be conveyed by said second conveyor, and an a priori determined targeted running-weigh-scale value; a method of controlling the thickness or weight of the extruded elastomer comprising the steps of:

measuring the weight value of the extrusion at the running-weigh-scale;

comparing the targeted running-weigh-scale value to said measured value to obtain a control signal; and adjusting the difference in speed between said first conveyor belt and said second conveyer belt in response to said control.

2. The method of claim 1 further comprising:

controlling the difference between said rate of extrusion and said rate of speed of said first conveyor belt.

* * * * *